United States Patent
Seo et al.

(10) Patent No.: US 11,313,314 B2
(45) Date of Patent: Apr. 26, 2022

(54) CONTROL APPARATUS OF INTERNAL COMBUSTION ENGINE

(71) Applicant: TOYOTA JIDOSHA KABUSHIKI KAISHA, Aichi-ken (JP)

(72) Inventors: Hiromitsu Seo, Toyota (JP); Masatomo Yoshihara, Toyota (JP); Masanao Idogawa, Nagoya (JP); Takahiro Uchida, Okazaki (JP); Motohiro Sugimoto, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/359,648

(22) Filed: Jun. 28, 2021

(65) Prior Publication Data

US 2021/0404409 A1 Dec. 30, 2021

(30) Foreign Application Priority Data

Jun. 30, 2020 (JP) .............................. JP2020-112221

(51) Int. Cl.
  *F02D 41/38* (2006.01)
  *F02D 41/34* (2006.01)
(52) U.S. Cl.
  CPC ............. *F02D 41/38* (2013.01); *F02D 41/34* (2013.01); *F02D 2041/389* (2013.01)
(58) Field of Classification Search
  CPC ..... F02D 41/38; F02D 41/34; F02D 2041/389
  See application file for complete search history.

(56) References Cited

U.S. PATENT DOCUMENTS

| 5,983,857 | A | * | 11/1999 | Mamiya | .............. | F02D 41/0002 |
| | | | | | | 123/325 |
| 6,085,717 | A | * | 7/2000 | Kamura | .............. | F02D 41/1486 |
| | | | | | | 123/295 |
| 6,273,056 | B1 | * | 8/2001 | Shirakawa | .......... | F02D 41/3076 |
| | | | | | | 123/305 |
| 2015/0047606 | A1 | * | 2/2015 | Demura | ................ | F02P 5/1516 |
| | | | | | | 123/406.13 |
| 2016/0245214 | A1 | | 8/2016 | Shinagawa et al. | | |
| 2017/0260925 | A1 | * | 9/2017 | Ikeuchi | .................. | F02D 41/22 |

(Continued)

FOREIGN PATENT DOCUMENTS

| JP | 2016079909 A | * | 5/2016 | ............. F02D 41/02 |
| JP | 2016151261 A | | 8/2016 | |

(Continued)

*Primary Examiner* — Joseph J Dallo
(74) *Attorney, Agent, or Firm* — Hauptman Ham, LLP

(57) ABSTRACT

A control apparatus of an internal combustion engine is provided. The internal combustion engine includes a port injection valve that injects fuel into an intake-air port, and a cylinder injection valve that injects fuel into a cylinder. The control apparatus includes an electronic control unit that controls the port injection valve and the cylinder injection valve such that when returning from a fuel cut, a value of a port increase amount correction, which is a fuel increase amount correction in which a fuel amount is decreased with a lapse of time during a port injection, differs from a value of a cylinder increase amount correction, which is a fuel increase amount correction in which a fuel amount is decreased with a lapse of time during a cylinder injection.

4 Claims, 4 Drawing Sheets

(56) References Cited

U.S. PATENT DOCUMENTS

| | | | |
|---|---|---|---|
| 2017/0342937 A1* | 11/2017 | Nakano | F02D 41/3836 |
| 2018/0045132 A1* | 2/2018 | Han | F02D 41/3094 |
| 2018/0230928 A1 | 8/2018 | Kitazume et al. | |
| 2020/0291887 A1* | 9/2020 | Nishi | F02D 35/024 |
| 2020/0318559 A1* | 10/2020 | Miyashita | F02D 13/0215 |
| 2020/0325832 A1* | 10/2020 | Kato | F02D 41/065 |
| 2020/0325833 A1* | 10/2020 | Kato | F02M 61/14 |
| 2021/0108582 A1* | 4/2021 | Nose | F01N 3/20 |

FOREIGN PATENT DOCUMENTS

| | | | |
|---|---|---|---|
| JP | 2018131957 A | 8/2018 | |
| JP | 2019108824 A | 7/2019 | |

\* cited by examiner

US 11,313,314 B2

CONTROL APPARATUS OF INTERNAL COMBUSTION ENGINE

CROSS-REFERENCE TO RELATED APPLICATION

This application claims priority to Japanese Patent Application No. 2020-112221 filed on Jun. 30, 2020, incorporated herein by reference in its entirety.

BACKGROUND

1. Technical Field

The present disclosure relates to a control apparatus of an internal combustion engine, and, particularly, to a control apparatus of an in-vehicle internal combustion engine having a port injection valve and a cylinder injection valve.

2. Description of Related Art

As a control apparatus of this type of internal combustion engine, an apparatus that sets, when a fuel cut is ended and fuel injection is executed, an increase amount coefficient with respect to a base injection amount such that the increase amount coefficient in a case where a duration of the fuel cut is short is smaller than that in a case where the duration of the fuel cut is long has been proposed (see, for example, Japanese Unexamined Patent Application Publication No. 2016-151261). Since an engine or an intake-air port becomes cool when the duration of the fuel cut becomes long, it is necessary to increase an amount of fuel for fuel injection after returning from the fuel cut. In this case, since the engine or the intake-air port becomes cooler, as the duration of the fuel cut becomes longer, the amount of an increase in the fuel becomes great.

SUMMARY

In a control apparatus of an in-vehicle internal combustion engine having a port injection valve and a cylinder injection valve, an intake-air port becomes cooler by a fuel cut than a cylinder does. For this reason, when the fuel increase amount in fuel injection after returning from the fuel cut is the same for the port injection and the cylinder injection, combustion in the port injection, combustion in the cylinder injection, or combustion in both injections may become unstable.

A control apparatus of an internal combustion engine according to the present disclosure enables combustion after returning from a fuel cut to become more stable.

The control apparatus of the internal combustion engine according to the present disclosure employs configurations hereinbelow.

One aspect of the present disclosure is a control apparatus of an internal combustion engine. The internal combustion engine includes a cylinder injection valve that injects fuel into an intake-air port, and a cylinder injection valve that injects fuel into a cylinder. The control apparatus includes an electronic control unit configured to control the port injection valve and the cylinder injection valve such that when returning from a fuel cut that stops a fuel injection from the port injection valve and the cylinder injection valve, a value of a port increase amount correction that is a fuel increase amount correction in which a fuel amount is decreased with a lapse of time during a port injection differs from a value of a cylinder increase amount correction that is a fuel increase amount correction in which a fuel amount is decreased with a lapse of time during a cylinder injection. The fuel is injected from the port injection valve in the port injection and is injected from the cylinder injection valve in the cylinder injection.

In the control apparatus of the internal combustion engine according to the present disclosure, when returning from a fuel cut, a value of a port increase amount correction that is a fuel increase amount correction in which a fuel amount is decreased with a lapse of time during a port injection for injecting the fuel from the port injection valve differs from a value of a cylinder increase amount correction that is a fuel increase amount correction in which a fuel amount is decreased with a lapse of time during a cylinder injection for injecting the fuel from the cylinder injection valve. In other words, more appropriate port increase amount correction and cylinder increase amount correction are set and used. As a result, combustion after returning from the fuel cut can become more stable.

In the above aspect, the value of the port increase amount correction may be greater than the value of the cylinder increase amount correction. This is based on the fact that the intake-air port becomes cooler by the fuel cut than the cylinder does.

In the above aspect, the values of the port increase amount correction and the cylinder increase amount correction may become greater as a duration of the fuel cut becomes longer. This is based on the fact that the longer the duration of the fuel cut becomes, the cooler the intake-air port or the cylinder becomes.

In the above aspect, when returning from the fuel cut, the electronic control unit may control the port injection valve and the cylinder injection valve such that the port increase amount correction is switched to the cylinder increase amount correction with a lapse of time when the port injection is switched to the cylinder injection, and the cylinder increase amount correction is switched to the port increase amount correction with a lapse of time when the cylinder injection is switched to the port injection. As a result, during the execution of the increase amount correction after returning from the fuel cut, combustion can become more stable both when the port injection is switched to the cylinder injection and, conversely, when the cylinder injection is switched to the port injection.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Next, a form in which the present disclosure is implemented will be described using embodiments.

Figure 1:
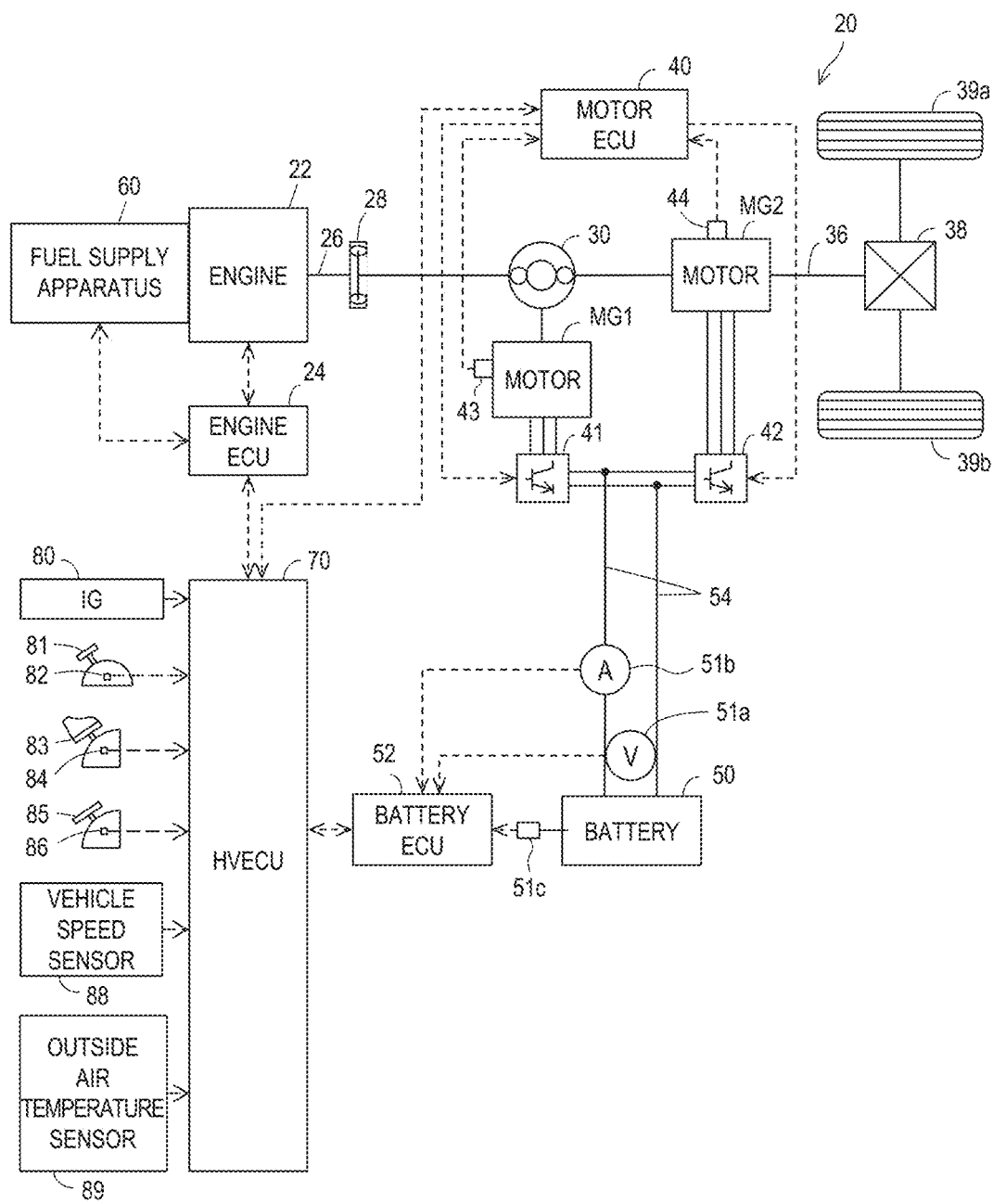
FIG. 1 is a configuration diagram schematically illustrating a configuration of a hybrid vehicle as an embodiment of the present disclosure.
Figure 2:
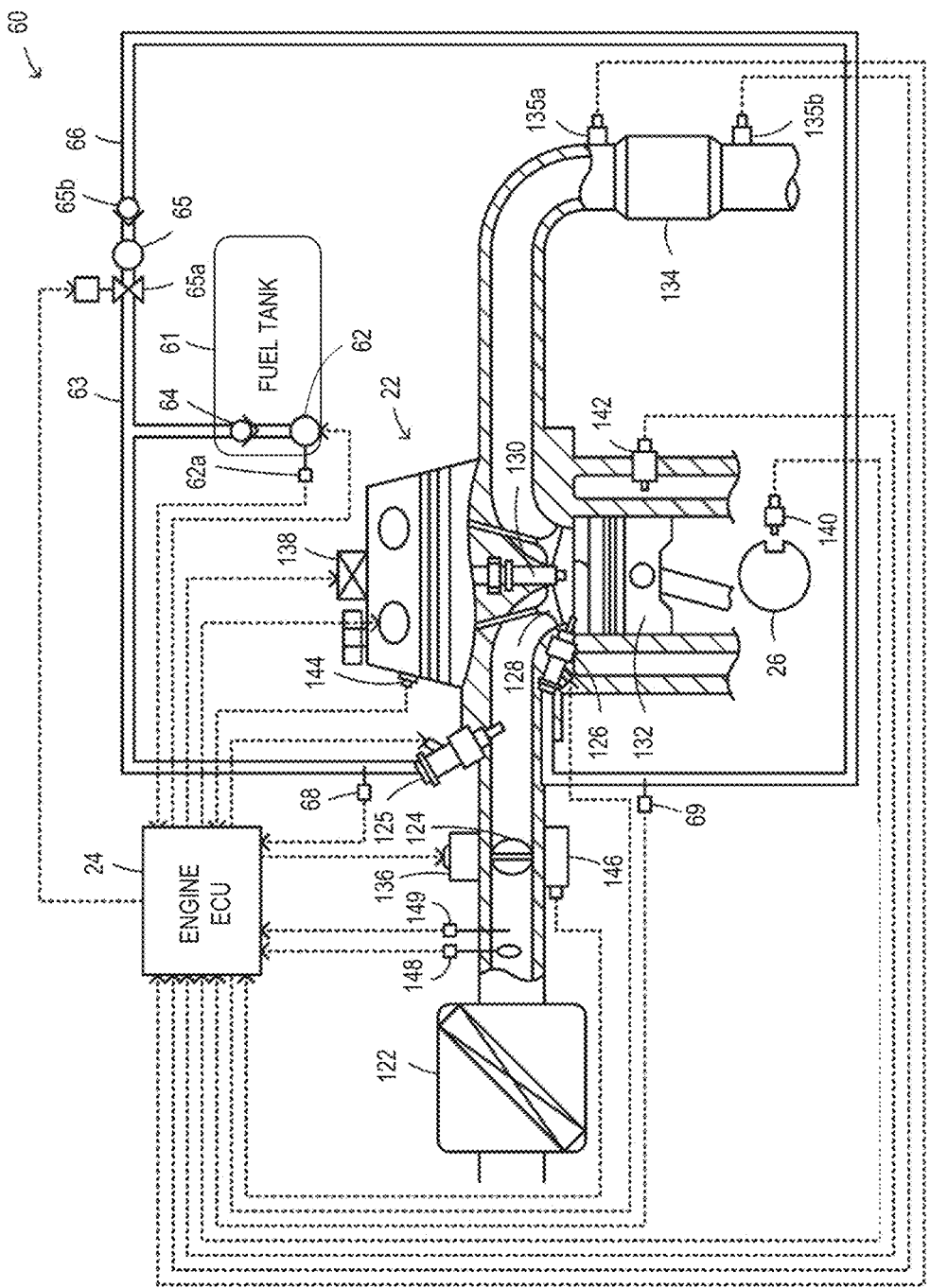
FIG. 2 is a configuration diagram schematically illustrating a configuration of an engine or a fuel supply apparatus.

FIG. 1 is a configuration diagram schematically illustrating a configuration of a hybrid vehicle 20 as an embodiment of the present disclosure and FIG. 2 is a configuration diagram schematically illustrating a configuration of an engine 22 or a fuel supply apparatus 60. As illustrated in FIG. 1, a hybrid vehicle 20 according to the embodiment includes the engine 22, the fuel supply apparatus 60, a planetary gear 30, motors MG1, MG2, inverters 41, 42, a battery 50, and a hybrid electronic control unit (hereinafter referred to as an "HVECU") 70. As a control apparatus of an internal combustion engine, at least an engine ECU 24 is included.

The engine 22 is configured as an internal combustion engine that outputs power using fuel such as gasoline or light oil. As illustrated in FIG. 2, the engine 22 includes a port injection valve 125 that injects fuel into an intake-air port, and a cylinder injection valve 126 that injects fuel into a cylinder. By having the port injection valve 125 and the cylinder injection valve 126, the engine 22 can be driven either in a port injection mode or in a cylinder injection mode. In the port injection mode, the air cleaned by an air cleaner 122 is taken in via a throttle valve 124 and fuel is injected from the port injection valve 125 such that the air and the fuel are mixed. Then, the air-fuel mixture is taken into a combustion chamber via an intake-air valve 128, and is explosively combusted by an electric spark from a spark plug 130. Then, a reciprocating motion of a piston 132 pushed down by the energy generated by the explosive combustion is converted into rotational motion of a crankshaft 26. In the cylinder injection mode, the air is taken into the combustion chamber in the same manner as in the port injection mode, and the fuel is injected from the cylinder injection valve 126 during intake-air stroke or at the start of compression stroke. Then, the fuel is explosively combusted by an electric spark from the spark plug 130 and the rotational motion of the crankshaft 26 is obtained. These injection modes are switched therebetween based on a driving state of the engine 22. Exhaust gas discharged from the combustion chamber is discharged to the outside air via an exhaust gas control apparatus 134 having an exhaust gas control catalyst (a three-way catalyst) that removes harmful components, such as carbon monoxide (CO), hydrocarbon (HC), or nitrogen oxides ($NO_x$).

As illustrated in FIG. 2, the fuel supply apparatus 60 is configured to supply the fuel to the port injection valve 125 and the cylinder injection valve 126 of the engine 22. The fuel supply apparatus 60 includes a fuel tank 61, a feed pump (a first pump) 62 that supplies fuel from the fuel tank 61 to a low-pressure side flow path (a first flow path) 63 to which the port injection valve 125 is connected, a check valve 64 provided on the low-pressure side flow path 63, and a high-pressure fuel pump (a second pump) 65 that pressurizes fuel on the port injection valve 125 side of the check valve 64 in the low-pressure side flow path 63 and supplies the fuel to a high-pressure side flow path (a second flow path) 66 to which the cylinder injection valve 126 is connected.

The feed pump 62 and the check valve 64 are arranged in the fuel tank 61. The feed pump 62 is configured as an electric pump that is operated by receiving electric power supplied from the battery 50. The check valve 64 is opened when a fuel pressure (a pressure of the fuel) on the feed pump 62 side is higher than the fuel pressure on the port injection valve 125 side in the low-pressure side flow path 63, and is closed when the fuel pressure on the feed pump 62 side is equal to or lower than the fuel pressure on the port injection valve 125 side.

The high-pressure fuel pump 65 is driven by power from the engine 22 (rotation of a camshaft) so as to pressurize the fuel in the low-pressure side flow path 63. The high-pressure fuel pump 65 has an electromagnetic valve 65a connected to an inlet thereof, which is opened/closed when pressurizing the fuel, and a check valve 65b connected to an outlet thereof, which prevents a reverse flow of the fuel and maintains the fuel pressure in the high-pressure side flow path 66. During the driving of the engine 22, the high-pressure fuel pump 65 receives, when the electromagnetic valve 65a is opened, the fuel from the feed pump 62, and pressurizes, when the electromagnetic valve 65a is closed, the fuel supplied to the high-pressure side flow path 66 by intermittently feeding the fuel that has been compressed by a plunger (not shown) operated by power from the engine 22 to the high-pressure side flow path 66 via the check valve 65b. During the driving of the high-pressure fuel pump 65, the fuel pressure in the low-pressure side flow path 63 or the fuel pressure in the high-pressure side flow path 66 is pulsated according to the rotation of the engine 22 (the rotation of the camshaft).

The driving of the engine 22 and the fuel supply apparatus 60 is controlled by an electronic control unit for an engine (hereinafter, referred to as an "engine ECU") 24. The engine ECU 24 is configured as a microprocessor (not shown) having a CPU as a main unit, and includes a ROM that stores a processing program, a RAM that temporarily stores data, input/output ports, and a communication port in addition to the CPU.

Signals from various sensors necessary for controlling the driving of the engine 22 and controlling the fuel supply apparatus 60 are input to the engine ECU 24 via the input port. Examples of the signals input to the engine ECU 24 can include a crank position Oar from a crank position sensor 140 that detects a rotational position of the crankshaft 26, a coolant temperature $T_w$ from a coolant temperature sensor 142 that detects the temperature of the coolant of the engine 22, a cam position $\theta_{ca}$ from a cam position sensor 144 that detects a rotational position of an intake camshaft that opens/closes the intake-air valve 128 or an exhaust camshaft that opens/closes an exhaust valve, a throttle opening degree TH from a throttle valve position sensor 146 that detects a position of the throttle valve 124, an intake-air amount $Q_a$ from an air flow meter 148 mounted on an intake-air pipe, an intake-air temperature $T_a$ from a temperature sensor 149 mounted on the intake-air pipe, an air-fuel ratio AF from an air-fuel ratio sensor 135a mounted on an exhaust pipe, an oxygen signal $O_2$ from an oxygen sensor 135b mounted on the exhaust pipe, a rotation speed $N_{fp}$ of the feed pump 62 from a rotation speed sensor 62a mounted on the feed pump 62 of the fuel supply apparatus 60, a fuel pressure $P_{fp}$ of the fuel supplied to the port injection valve 125 from a fuel pressure sensor 68 mounted in the vicinity of the port injection valve 125 in the low-pressure side flow path 63, and a fuel pressure $P_{fd}$ of the fuel supplied to the cylinder injection valve 126 from a fuel pressure sensor 69 mounted in the vicinity of the cylinder injection valve 126 in the high-pressure side flow path 66.

Signals from various sensors necessary for controlling the driving of the engine 22 and controlling the fuel supply apparatus 60 are output to the engine ECU 24 via the output port. Examples of the signals output from the engine ECU 24 can include a drive signal to the port injection valve 125, a drive signal to the cylinder injection valve 126, a drive signal to a throttle motor 136 that adjusts the position of the throttle valve 124, a control signal to an ignition coil 138 integrated with an igniter, a drive control signal to the feed pump 62, and a drive control signal to the electromagnetic valve 65a of the high-pressure fuel pump 65.

The engine ECU 24 is connected to the HVECU 70 via the communication port. The engine ECU 24 calculates a rotation speed $N_e$ of the engine 22 based on the crank angle $\theta_{cr}$ from the crank position sensor 140. Further, the engine ECU 24 calculates a volumetric efficiency (a ratio of a volume of the air that is actually taken in in one cycle to a stroke volume of the engine 22 per cycle) KL based on the intake-air amount $Q_a$ from the air flow meter 148 and the rotation speed $N_e$ of the engine 22.

As illustrated in FIG. 1, the planetary gear 30 is configured as a single pinion-type planetary gear mechanism. A rotor of the motor MG1 is connected to a sun gear of the planetary gear 30. A drive shaft 36 connected to drive wheels 39a, 39b via a differential gear 38 is connected to a ring gear of the planetary gear 30. The crankshaft 26 of the engine 22 is connected to a carrier of the planetary gear 30 via a damper 28.

The motor MG1 is configured as, for example, a synchronous motor generator, and as described above, has a rotor connected to the sun gear of the planetary gear 30. The motor MG2 is configured as, for example, a synchronous motor generator, and has a rotor connected to the drive shaft 36. The inverters 41, 42 are connected to the motors MG1, MG2, respectively, and to the battery 50 via power lines 54. The motors MG1, MG2 are rotationally driven by controlling switching of a plurality of switching elements (not shown) of the inverters 41, 42 using an electronic control unit for motors (hereinafter referred to as a "motor ECU") 40.

The motor ECU 40 is configured as a microprocessor (not shown) having a CPU as a main unit, and includes a ROM that stores a processing program, a RAM that temporarily stores data, input/output ports, and a communication port in addition to the CPU. Signals from various sensors necessary for controlling the driving of the motors MG1, MG2 are input to the motor ECU 40 via the input port. Examples of the signals can include rotation positions $\theta_{m1}$, $\theta_{m2}$ from rotation position detection sensors 43, 44 that detect rotation positions of the rotors of the motors MG1, MG2, and a temperature $t_{m2}$ of the motor MG2 from the temperature sensor that detects the temperature of the motor MG2. A signal for controlling the switching of the plurality of switching elements (not shown) of the inverters 41, 42, and the like, is output from the motor ECU 40 via the output port. The motor ECU 40 is connected to the HVECU 70 via the communication port. The motor ECU 40 calculates rotation speeds $N_{m1}$, $N_{m2}$ of the motors MG1, MG2, respectively, based on the rotation positions $\theta_{m1}$, $\theta_{m2}$ of the rotors of the motors MG1, MG2 from the rotation position detection sensors 43, 44.

The battery 50 is configured as, for example, a lithium-ion secondary battery or a nickel-hydrogen secondary battery, and is connected to the inverters 41, 42 via the power lines 54. The battery 50 is managed by an electronic control unit for a battery (hereinafter, referred to as a "battery ECU") 52.

The battery ECU 52 is configured as a microprocessor (not shown) having a CPU as a main unit, and includes a ROM that stores a processing program, a RAM that temporarily stores data, input/output ports, and a communication port in addition to the CPU. Signals from various sensors necessary for managing the battery 50 are input to the battery ECU 52 via the input port. Examples of the signals input to the battery ECU 52 can include a battery voltage $V_b$ from a voltage sensor 51a installed between terminals of the battery 50, a battery current $I_b$ from a current sensor 51b mounted on an output terminal of the battery 50, and a battery temperature $T_b$ from a temperature sensor 51c mounted on the battery 50. The battery ECU 52 is connected to the HVECU 70 via the communication port. The battery ECU 52 calculates a power storage ratio SOC based on the integrated value of the battery current $I_b$ from the current sensor 51b. The power storage ratio SOC is a ratio of the capacity of electric power dischargeable from the battery 50 to the total capacity of the battery 50.

The HVECU 70 is configured as a microprocessor (not shown) having a CPU as a main unit, and includes a ROM that stores a processing program, a RAM that temporarily stores data, input/output ports, and a communication port in addition to the CPU. Signals from various sensors are input to the HVECU 70 via the input port. Examples of the signals input to the HVECU 70 can include an ignition signal from an ignition switch 80, a shift position SP from a shift position sensor 82 that detects an operating position of a shift lever 81, an accelerator opening degree $A_{cc}$ from an accelerator pedal position sensor 84 that detects a depression amount of an accelerator pedal 83, a brake pedal position BP from a brake pedal position sensor 86 that detects a depression amount of a brake pedal 85, a vehicle speed V from a vehicle speed sensor 88, and an outside air temperature $T_{out}$ from an outside air temperature sensor 89. As described above, the HVECU 70 is connected to the engine ECU 24, the motor ECU 40, or the battery ECU 52 via the communication port.

In the hybrid vehicle 20 of the embodiment configured in this manner, a required drive force of the drive shaft 36 is set based on the accelerator opening degree $A_{cc}$ and the vehicle speed V, and the driving of the engine 22 and the motors MG1, MG2 is controlled such that a required power corresponding to the required driving force is output to the drive shaft 36. Driving modes of the engine 22 and the motors MG1, MG2 include modes (1) to (3) below.

(1) Torque conversion driving mode: A mode in which the driving of the engine 22 is controlled such that power corresponding to the required driving force is output from the engine 22, and the driving of the motors MG1, MG2 is controlled such that all the power output from the engine 22 is converted into torque by the planetary gear 30 and the motors MG1, MG2, and the required power is output to the drive shaft 36.

(2) Charging/discharging driving mode: A mode in which the driving of the engine 22 is controlled such that power corresponding to a sum of the required power and the electric power necessary for charging/discharging the battery 50 is output from the engine 22, and the driving of the motors MG1, MG2 is controlled such that all or part of the power output from the engine 22 is converted into torque by the planetary gear 30 and the motors MG1, MG2 according to the charging/discharging of the battery 50, and the required power is output to the drive shaft 36.

(3) Motor driving mode: A mode in which the driving of the motor MG2 is controlled such that the driving of the engine 22 is stopped and the required power is output to the drive shaft 36.

Further, in the hybrid vehicle 20 according to the embodiment, during the driving of the engine 22, the engine ECU 24 controls the intake-air amount, the fuel injection, or the feed pump 62 or the high-pressure fuel pump 65 of the fuel supply apparatus 60.

The intake-air amount of the engine 22 is controlled by, first, setting a target intake-air amount $Q_a*$ based on a target torque $T_c*$ of the engine 22, subsequently setting a target throttle opening degree TH* such that the intake-air amount $Q_a$ becomes the target intake-air amount $Q_a*$, and then, controlling the throttle motor 136 such that the throttle opening degree TH becomes the target throttle opening degree TH*.

The fuel injection is controlled by, first, setting an injection mode for execution from among the port injection mode and the cylinder injection mode based on the rotation speed $N_e$ and the volumetric efficiency KL of the engine 22, subsequently setting, based on the target intake-air amount $Q_a*$ and the injection mode for execution, a target injection amount $Q_{fp}*$ of the port injection valve 125 and a target injection amount $Q_{fd}*$ of the cylinder injection valve 126 such that the air-fuel ratio AF becomes a target air-fuel ratio AF* (for example, the stoichiometric air-fuel ratio), and then, setting a target injection time $\tau_{fp}*$ of the port injection valve 125 or a target injection time $\tau_{fd}*$ of the cylinder injection valve 126 based on the target injection amounts $Q_{fp}*$, $Q_{fd}*$ and the fuel pressures $P_{fp}$, $P_{fd}$. When the target injection times $\tau_{fp}*$, $\tau_{fd}*$ are set in this manner, the cylinder injection valve 126 or the port injection valve 125 is controlled such that the fuel is injected from the cylinder injection valve 126 or the port injection valve 125 at the target injection times $\tau_{fp}*$, $\tau_{fd}*$.

The feed pump 62 is controlled by, first, setting a target fuel pressure $P_{fp}*$ of the fuel supplied to the port injection valve 125, and a target discharge amount $Q_{pp}*$ of the feed pump 62 that is based on a target injection amount $Q_{fp}*$ of the port injection valve 125 or a target injection amount $Q_{fd}*$ of the cylinder injection valve 126. Here, in the embodiment, the target fuel pressure $P_{fp}*$ is set to a predetermined fuel pressure $P_{fp1}$, which is relatively high at the start of the driving of the engine 22, and is switched to a predetermined fuel pressure $P_{fp2}$, which is lower than the predetermined fuel pressure $P_{fp1}$ when a predetermined time $T_1$ elapses. As the predetermined fuel pressure $P_{fp1}$, for example, about 500 kPa to 550 kPa may be used, and as the predetermined fuel pressure $P_{fp2}$, for example, about 380 kPa to 420 kPa may be used. As the predetermined time $T_1$, for example, about 5 seconds to 7 seconds may be used. Further, in the embodiment, the target discharge amount $Q_{pp}*$ is set such that it becomes greater as the target fuel pressure $P_{fp}*$ becomes higher. When the target discharge amount $Q_{pp}*$ is set in this manner, the feed pump 62 is controlled such that the discharge amount (the fuel amount) from the feed pump 62 becomes the target discharge amount $Q_{pp}*$.

The high-pressure fuel pump 65 is controlled by, first, setting a target discharge amount $Q_{pd}*$ of the high-pressure fuel pump 65 based on a target fuel pressure $P_{fd}*$ of the fuel supplied to the cylinder injection valve 126. Here, as the target fuel pressure $P_{fd}*$, for example, about several MPa to a dozen MPa may be used. In the embodiment, the target discharge amount $Q_{pd}*$ is set such that it becomes greater as the target fuel pressure $P_{fd}*$ becomes higher, and becomes greater as the target injection amount $Q_{fd}*$ becomes greater. When the target discharge amount $Q_{pd}*$ is set in this manner, the electromagnetic valve 65a of the high-pressure fuel pump 65 is controlled such that the discharge amount (the fuel amount) from the high-pressure fuel pump 65 becomes the target discharge amount $Q_{pd}*$.

Figure 3:
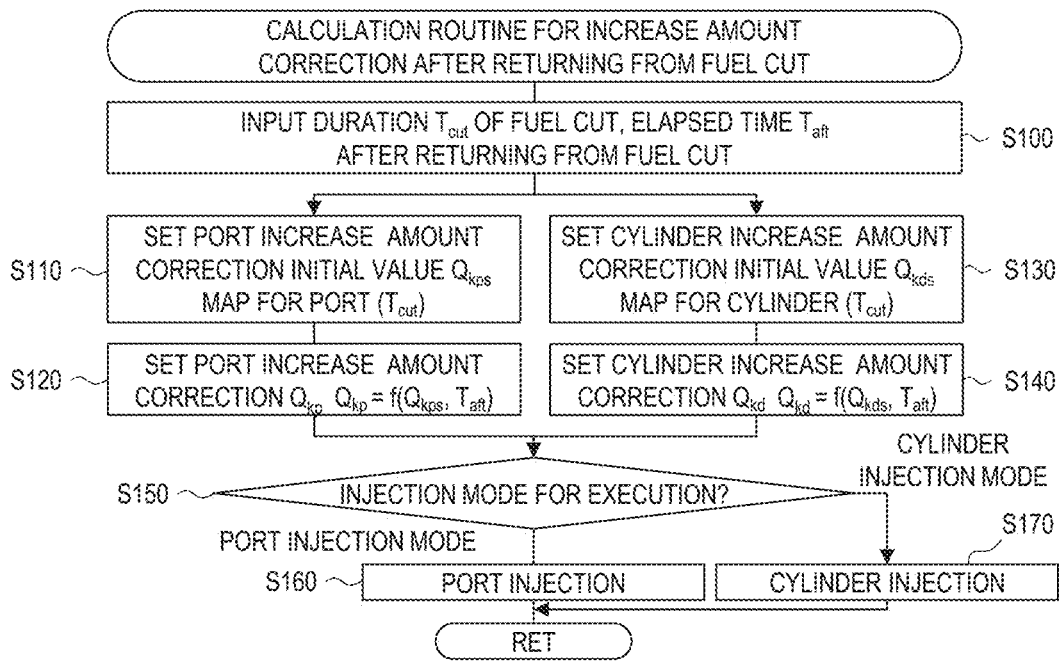
FIG. 3 is a flowchart illustrating an example of a calculation routine for an increase amount correction after returning from a fuel cut, executed by an engine ECU.

Next, an operation of the hybrid vehicle 20 of the embodiment configured in this manner, particularly a fuel injection control after returning from a fuel cut, will be described. In the fuel injection after returning from the fuel cut, the engine ECU 24 calculates an increase amount correction based on a duration $T_{cut}$ of the fuel cut and an elapsed time $T_{aft}$ after returning from the fuel cut, and the increase amount correction to the target injection amount $Q_{fp}*$, $Q_{fd}*$ of the port injection valve 125 and the cylinder injection valve 126 is executed, respectively. FIG. 3 is a flowchart illustrating an example of a calculation routine for the increase amount correction after returning from the fuel cut, executed by the engine ECU 24. The engine ECU 24 repeats this routine at predetermined time intervals.

When executing the calculation routine for the increase amount correction after returning from the fuel cut, the engine ECU 24 first inputs the duration $T_{cut}$ of the fuel cut and the elapsed time $T_{aft}$ after returning from the fuel cut (step S100). Then, the engine ECU 24 sets, as an increase amount correction, a port increase amount correction $Q_{kp}$ when the fuel is injected from the port injection valve 125 (steps S110 and S120), in parallel with setting, as an increase amount correction, a cylinder increase amount correction $Q_{kd}$ when the fuel is injected from the cylinder injection valve 126 (steps S130 and S140).

Figure 4:
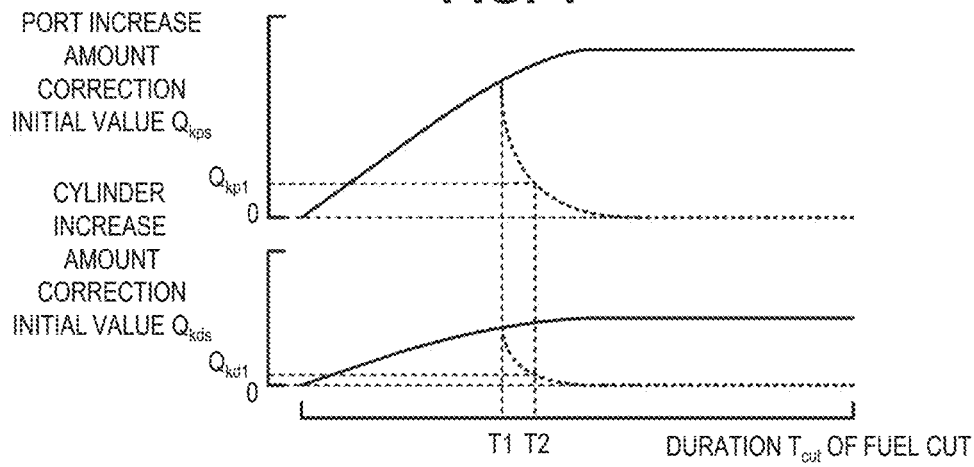
FIG. 4 is an explanatory diagram illustrating examples of a port map and a cylinder map.

The port increase amount correction $Q_{kp}$ can be set as below. First, the engine ECU 24 derives and sets a port increase amount correction initial value $Q_{kps}$ by applying the duration $T_{cut}$ of the fuel cut to a port map (step S110). FIG. 4 illustrates examples of a port map and a cylinder map. In FIG. 4, solid lines represent the port map and the cylinder map. In the embodiment, the port map represents a relationship between the duration $T_{cut}$ of the fuel cut and the port increase amount correction initial value $Q_{kps}$ obtained by experiments or the like. Subsequently, the engine ECU 24 sets the port increase amount correction $Q_{kp}$ based on the elapsed time $T_{aft}$ after returning from the fuel cut and the port increase amount correction initial value $Q_{kps}$ (step S120). In the embodiment, the port increase amount correction $Q_{kp}$ is obtained by multiplying the port increase amount correction initial value $Q_{kps}$ by a damping coefficient with respect to the elapsed time $T_{aft}$ after returning from the fuel cut, which is determined by experiments or the like. In FIG. 4, a dashed line with respect to the port increase amount correction initial value $Q_{kps}$ represents a change of the port increase amount correction $Q_{kp}$ over time, which is obtained by multiplying the damping coefficient and the port increase amount correction $Q_{kp}$ when the fuel cut is ended at time $T_1$.

The cylinder increase amount correction $Q_{kd}$ can be set as below. First, the engine ECU 24 derives and sets a cylinder increase amount correction initial value Qi by applying the duration $T_{cut}$ of the fuel cut to a cylinder map (step S130). In FIG. 4, the cylinder map is represented by the solid line at the bottom. In the embodiment, the cylinder map represents a relationship between the duration $T_{cut}$ of the fuel cut and the cylinder increase correction initial value $Q_{kds}$ obtained by experiments or the like. As can be seen from FIG. 4, the cylinder increase amount correction initial value $Q_{kds}$ is smaller than the port increase amount correction initial value $Q_{kps}$. This is based on the fact that the temperature of the intake-air port is lower than that inside the cylinder because it is difficult to cool the inside of the cylinder using the intake-air during the fuel cut by a coolant or the like, but it is easy to cool the intake-air port using the intake-air during the fuel cut. Subsequently, the engine ECU 24 sets the cylinder increase amount correction $Q_{kd}$ based on the elapsed time $T_{aft}$ after returning from the fuel cut and the port increase amount correction initial value $Q_{kds}$ (step S140). In the embodiment, the cylinder increase amount correction $Q_{kd}$ is obtained by multiplying the cylinder increase amount correction initial value $Q_{kds}$ by a damping coefficient with respect to the elapsed time $T_{aft}$ after returning from the fuel cut, which is determined by experiments or the like. In FIG. 4, a dashed line with respect to the cylinder increase amount correction initial value $Q_{kds}$ represents a change of the cylinder increase amount correction $Q_{kd}$ over time, which is obtained by multiplying the damping coefficient and the cylinder increase amount correction $Q_{kd}$ when the fuel cut is ended at time $T_1$.

Upon setting the port increase amount correction $Q_{kp}$ and the cylinder increase amount correction $Q_{kd}$ in this manner, the engine ECU 24 determines whether the injection mode for execution is the port injection mode or the cylinder injection mode (step S150). When the engine ECU 24 determines that the injection mode for execution is the port injection mode, the fuel is injected from the port injection valve 125 using the port increase amount correction $Q_{kp}$ (step S160), and this routine is ended. On the other hand, when the engine ECU 24 determines that the injection mode for execution is the cylinder injection mode, the fuel is injected from the cylinder injection valve 126 using the cylinder increase amount correction $Q_{kd}$ (step S170), and this routine is ended.

Figure 5:
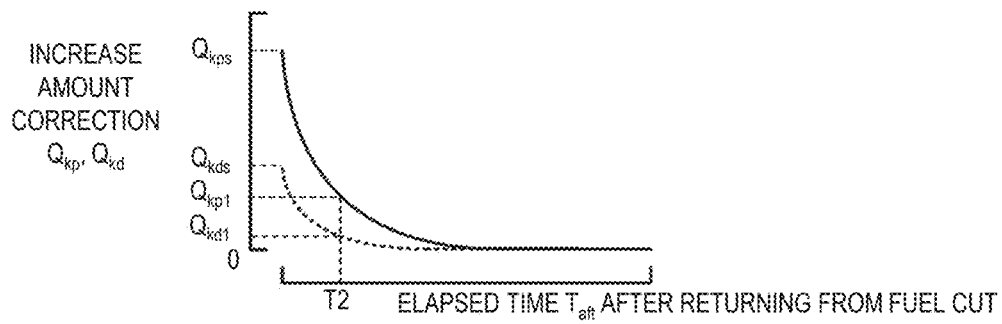
FIG. 5 is an explanatory diagram illustrating a port increase amount correction and a cylinder increase amount correction with respect to an elapsed time after returning from the fuel cut.

Now, a case where the injection mode for execution is switched from the port injection mode to the cylinder injection mode before an end of the increase amount correction after returning from the fuel cut will be considered. In this case, according to the calculation routine for the fuel increase amount correction after returning from the fuel cut of FIG. 3, the increase amount correction is switched from the port increase amount correction $Q_{kp}$, which is calculated using the port increase amount correction initial value $Q_{kps}$ based on the duration $T_{cut}$ of the fuel cut and the elapsed time $T_{aft}$ after returning from the fuel cut, to the cylinder increase amount correction $Q_{kd}$, which is calculated by the cylinder increase amount correction initial value $Q_{kds}$ based on the duration $T_{cut}$ of the fuel cut and the elapsed time $T_{aft}$ after returning from the fuel cut. FIG. 5 is an explanatory diagram illustrating the port increase amount correction $Q_{kp}$ and the cylinder increase amount correction $Q_{kd}$ according to the elapsed time $T_{aft}$ after returning from the fuel cut. A solid line represents a change of the port increase amount correction $Q_{kp}$ over time, and a dashed line represents a change of the cylinder increase amount correction $Q_{kd}$ over time. Considering a case where the port injection mode is switched to the cylinder injection mode at time $T_2$, the increase amount correction is switched from the port increase amount correction $Q_{kp}$ having a value $Q_{kp1}$ to the cylinder increase amount correction $Q_{kd}$ having a value $Q_{kd1}$. Conversely, considering a case where the cylinder injection mode is switched to the port injection mode at time $T_2$, the increase amount correction is switched from the cylinder increase amount correction $Q_{kd}$ having the value $Q_{kd1}$ to the port increase amount correction $Q_{kp}$ having the value $Q_{kp1}$. As a result, when the injection modes for execution are switched therebetween before the end of the increase amount correction after returning from the fuel cut, combustion can become more stable even before and after the switching of the injection modes for execution, by executing the increase amount correction corresponding to each injection mode.

In an engine apparatus mounted on the hybrid vehicle 20 of the above-described embodiment, when executing an increase amount correction after returning from the fuel cut, in the port injection mode, the port increase amount correction $Q_{kp}$ is set based on the port increase amount correction initial value $Q_{kps}$, which is obtained by applying the duration $T_{cut}$ of the fuel cut to the port map, and the elapsed time $T_{aft}$ after returning from the fuel cut. In the cylinder injection mode, the cylinder increase amount correction $Q_{kd}$ is set based on the cylinder increase amount correction initial value $Q_{kds}$, which is obtained by applying the duration $T_{cut}$ of the fuel cut to the cylinder map different from the port map, and the elapsed time $T_{aft}$ after returning from the fuel cut. As such, since the increase amount correction is executed by setting an increase amount correction initial value using a different map according to an injection mode for execution, combustion after returning from the fuel cut can become more stable regardless of the injection mode. In addition, since the increase amount correction is executed according to each injection mode even when the injection modes for execution are switched therebetween before the end of the increase amount correction after returning from the fuel cut, combustion can become more stable even before and after the switching of the injection modes for execution.

In the hybrid vehicle 20 according to the embodiment, as a power storage device, the battery 50 is used, but any device capable of storing power, such as a capacitor, may be used.

In the hybrid vehicle 20 according to the embodiment, the engine ECU 24, the motor ECU 40, the battery ECU 52, and the HVECU 70 are included, but at least two of them may be configured as a single electronic control unit.

Figure 6:
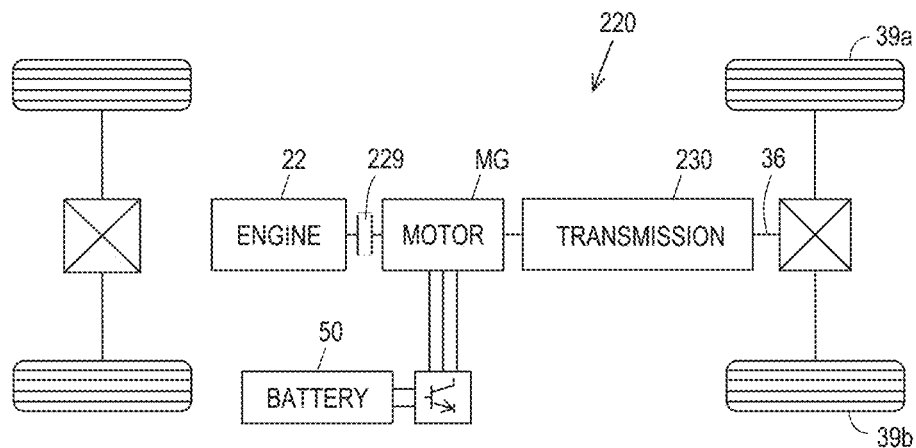
FIG. 6 is a configuration diagram schematically illustrating a configuration of a hybrid vehicle of a modified example.
Figure 7:
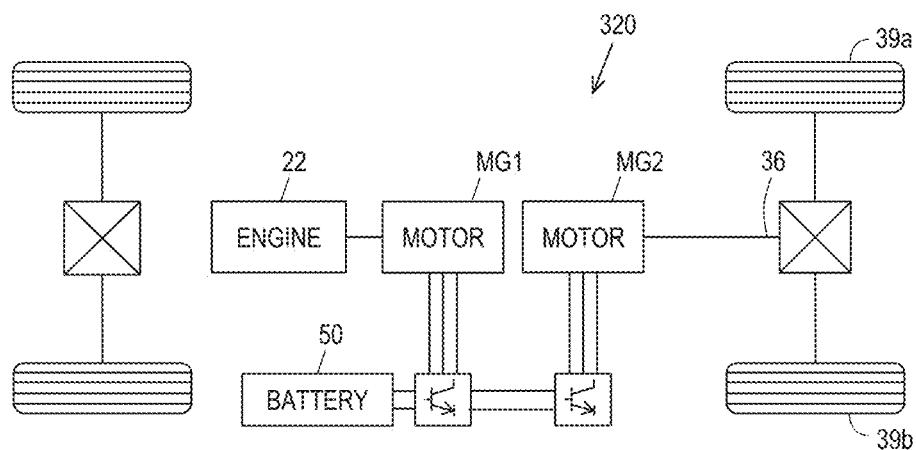
FIG. 7 is a configuration diagram schematically illustrating a configuration of a hybrid vehicle of another modified example.
Figure 8:
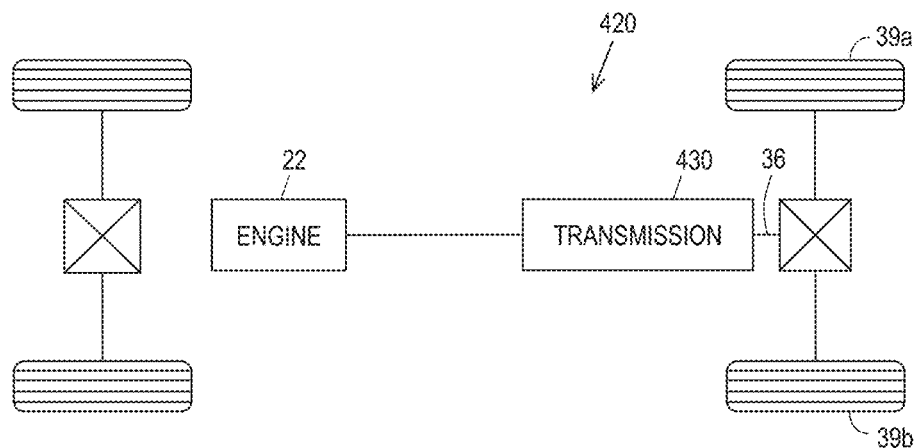
FIG. 8 is a configuration diagram schematically illustrating a configuration of a hybrid vehicle of still another modified example.

In the hybrid vehicle 20 according to the embodiment, the engine 22 and the motor MG1 are connected to the drive shaft 36 that is connected to the drive wheels 39a, 39b via the planetary gear 30, and the motor MG2 is connected to the drive shaft 36 so as to connect the motors MG1, MG2 to the battery 50 via power lines. However, as illustrated in a hybrid vehicle 220 of a modified example of FIG. 6, the vehicle may be configured as a so-called one-motor hybrid vehicle in which a motor MG is connected to the drive shaft 36 that is connected to the drive wheels 39a, 39b via a transmission 230, and the engine 22 is connected to the motor MG via a clutch 229 so as to connect the battery 50 to the motor MG via a power line. Further, as illustrated in a hybrid vehicle 320 of another modified example of FIG. 7, the vehicle may be configured as a so-called series hybrid vehicle in which a motor MG1 for generation is connected to the engine 22, and a motor MG2 for traveling is connected to the drive shaft 36 that is connected to the drive wheels 39a, 39b so as to connect the battery 50 to the motors MG1, MG2 via power lines. Further, as illustrated in a hybrid vehicle 420 of still another modified example of FIG. 8, the vehicle may be configured as a so-called gasoline vehicle in which the engine 22 is connected to the drive shaft 36 that is connected to the drive wheels 39a, 39b via a transmission 430.

The correspondence between the main elements in the embodiment and the SUMMARY will be described. In the embodiment, the port injection valve 125 corresponds to the "port injection valve", the cylinder injection valve 126 corresponds to the "cylinder injection valve", the engine 22 corresponds to the "internal combustion engine", and the engine ECU 24 corresponds to the "control apparatus".

Since the embodiment is an example that is intended to specifically describe the form in the SUMMARY is implemented, the correspondence between the main elements in the embodiment and those described in the SUMMARY does not limit the elements described in the SUMMARY. In other words, the present disclosure described in the SUMMARY should be interpreted based on the description therein, and the embodiment is merely a specific example of the present disclosure described in the SUMMARY.

Although the form in which the present disclosure is implemented has been described above using the embodiment, an applicable embodiment of the present disclosure is not limited thereto, and can be implemented in various forms within a range not departing from the scope of the present disclosure.

The present disclosure is applicable to the manufacturing industry of a control apparatus of an internal combustion engine and the like.

What is claimed is:

1. A control apparatus of an internal combustion engine, the internal combustion engine including a port injection valve that injects fuel into an intake-air port, and a cylinder injection valve that injects fuel into a cylinder, the control apparatus comprising:
an electronic control unit configured to control the port injection valve and the cylinder injection valve such that when returning from a fuel cut that stops fuel injection from the port injection valve and the cylinder injection valve, a value of a port increase amount correction that is a fuel increase amount correction in which a fuel amount is decreased with a lapse of time during a port injection differs from a value of a cylinder increase amount correction that is a fuel increase amount correction in which a fuel amount is decreased with a lapse of time during a cylinder injection, the fuel being injected from the port injection valve in the port injection and injected from the cylinder injection valve in the cylinder injection.

2. The control apparatus according to claim 1, wherein the value of the port increase amount correction is greater than the value of the cylinder increase amount correction.

3. The control apparatus according to claim 1, wherein the values of the port increase amount correction and the cylinder increase amount correction become greater as a duration of the fuel cut becomes longer.

4. The control apparatus according to claim 1, wherein the electronic control unit is configured to, when the fuel is injected after the fuel cut, control the port injection valve and the cylinder injection valve such that the port increase amount correction is switched to the cylinder increase amount correction with the lapse of time when the port injection is switched to the cylinder injection, and the cylinder increase amount correction is switched to the port increase amount correction with the lapse of time when the cylinder injection is switched to the port injection.

* * * * *